(12) United States Patent
Bengtsson et al.

(10) Patent No.: US 8,433,776 B2
(45) Date of Patent: Apr. 30, 2013

(54) METHOD AND ARRANGEMENT FOR SPREAD OF APPLICATIONS

(75) Inventors: Henrik Bengtsson, Lund (SE); Troed Sångberg, Malmö (SE); Ola Montán, Åkarp (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1569 days.

(21) Appl. No.: 11/686,220

(22) Filed: Mar. 14, 2007

(65) Prior Publication Data

US 2008/0229304 A1 Sep. 18, 2008

(51) Int. Cl.
*G06F 15/16* (2006.01)

(52) U.S. Cl.
USPC ........................................................ 709/219

(58) Field of Classification Search .................... 709/219
See application file for complete search history.

(56) References Cited

U.S. PATENT DOCUMENTS

| | | | |
|---|---|---|---|
| 6,195,678 B1 * | 2/2001 | Komuro | 709/202 |
| 2007/0015458 A1 * | 1/2007 | Corbett | 455/3.06 |
| 2007/0099659 A1 * | 5/2007 | Borquez et al. | 455/556.2 |

FOREIGN PATENT DOCUMENTS

| | | |
|---|---|---|
| EP | 1 743 681 A1 | 7/2005 |
| WO | WO 2004/105411 A1 | 12/2004 |
| WO | WO 2006/075060 A1 | 7/2006 |

OTHER PUBLICATIONS

International Search Report and Written Opinion issued for corresponding international application No. PCT/EP2007/004193, mailed Dec. 12, 2007, 11 pages.

* cited by examiner

*Primary Examiner* — Hussein Elchanti
*Assistant Examiner* — Maceeh Anwari
(74) *Attorney, Agent, or Firm* — Harrity & Harrity, LLP

(57) ABSTRACT

It is provided a mechanism for improving the procedure for a first communication device to send a message to a second device, the message including a link to an application server where the second device is requested to perform down load an application. A method in a first communications device (first device) including sending a message to a second communication device (second device), the message including a link to an application server from where an application can be downloaded into the second device; obtaining first information from the application server whether the second device has activated the link received in the message, and started to download the application, the first information indicating whether the second device has started to download the application, and indicating whether the second device downloads the application when the first information is obtained.

24 Claims, 4 Drawing Sheets

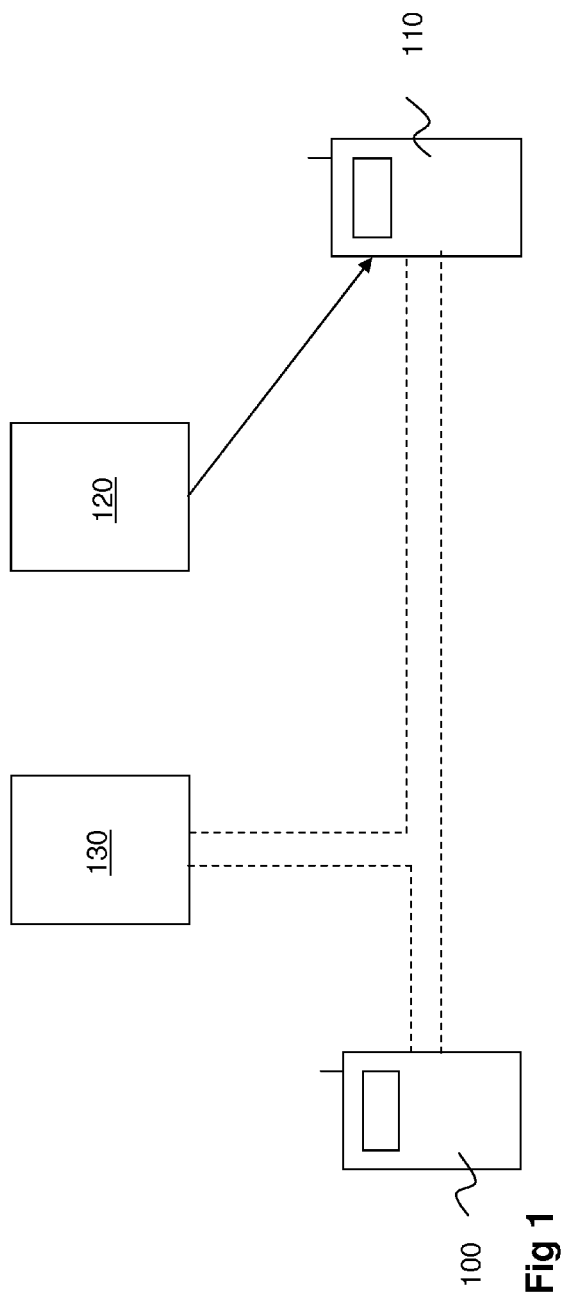
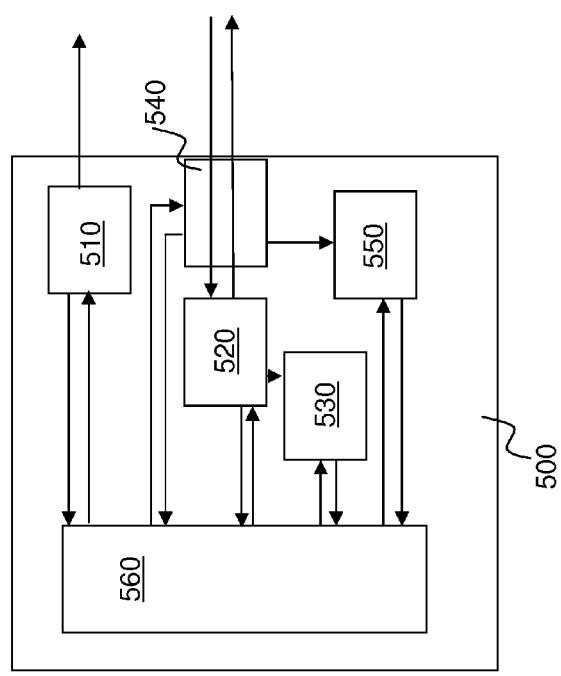

METHOD AND ARRANGEMENT FOR SPREAD OF APPLICATIONS

TECHNICAL FIELD

The present invention relates to a method and an arrangement for sharing of applications among communication devices.

RELATED ART

Presently, the telecom industry lags behind in introducing new features and updated applications in communication devices, such as mobile phones. That is, such features typically requires standardization, and implementation, and interoperability (IOP) testing and role out in the operator networks. Currently, introducing a new feature requiring a new application is accomplished by standardizing the new feature and then including the new application in mobile phones going forward, for example, during manufacture or initial programming. Consequently, existing mobile phones (e.g., already on the market) may be excluded from the introduction of new features and applications. That is, existing mobile phones are not retrofit with new features/applications.

Attempt to address this situation include using autospreading, also referred to as quickershare. If a first phone contacts a second phone, with the purpose, for example, of establishing a chat, and if the technique of autospreading is used, the first communication device will invite the second communication device, by using, for example, a Short Message Service (SMS) bearer. This may be performed through a Java (or other standard) based client. If the second phone already has the application, it will autostart, and the user of the first phone may chat with the user of the second phone. If the application does not exist in the second phone, however, the user of the second phone will be requested to download the application. The request may, for example, appear as a text and/or a link in the SMS.

Disadvantageously, the user of the first phone will need to wait for a period of time before getting in contact with the user of the second phone, in the case where the application first needs to be downloaded and installed. The user of the first phone may need to continuously monitor the display in the first phone to learn whether contact is successful or not.

SUMMARY

Implementations of the invention provide a mechanism for improving the procedure for a first communication device to send a message to a second device, the message including a link to an application server where the second device is requested to perform download an application.

According to a first aspect of the invention, a method in a first communications device (first device) includes the steps of: sending a message to a second communication device (second device), the message comprising a link to an application server from where an application can be downloaded into the second device; obtaining a first information from the application server whether or not the second device has activated the link received in the message, and started to down load the application, said first information indicating whether or not the second device has started to download the application, and indicating whether or not the second device downloads the application when the first information is obtained.

According to a second aspect of the invention, a method in an application server that provides an application to be downloaded into a second communication device (second device), includes the steps of: receiving a request for download of the application from the second device, when the second device has received a message from a first device, the message including a link to the application server for downloading the application, and when the link in the message is activated in the second device; and sending a first information to the first device when the request for download is received, the first information indicating whether or not the second device has started to download the application.

According to a third aspect of the invention, an arrangement in a first communication device (first device) includes a transmitter adapted to send a message to a second communication device (second device), the message including a link to an application server from where an application may be downloaded into the second device. The first device arrangement may include an information obtaining unit adapted to obtain a first information from the application server whether or not the second device has activated the link received in the message, and started to down load the application, said first information indicating whether or not the second device has started to download the application. The first device arrangement may include an indication unit adapted to indicate whether or not the second device downloads the application when the first information is obtained.

According to a fourth aspect of the invention, an arrangement in an application server is adapted to provide an application to be downloaded into a second communication device (second device). The application server arrangement includes a receiver adapted to receive a request for download of the application from the second device, when the second device has received a message from a first device, the message including a link to the application server for downloading the application, and when the link in the message is activated in the second device. The application server arrangement may include a sending unit adapted to send a first information to the first device when the request for download is received, the first information indicating whether or not the second device has started to download the application.

Because the first device receives status information from the application server indicating whether the second device downloads the application and such is indicated in the first device, the user of the first device is accordingly informed and provided knowledge of how the download is proceeding in the second device. This implies the procedure for a first communication device to send a message to a second device, the message including a link to an application server where the second device is requested to perform a download an application.

An advantage of the present invention is that the indication will aid the user of the first device, for example, by informing the user, so that may, within a few seconds, expect the application within the second device to be up and running or not.

Another advantage of the present invention is that the system can obtain knowledge about which type of devices that succeed with download of the application and which type of devices are likely to fail.

A further advantage is that the present invention may be accomplished independently of an operator.

BRIEF DESCRIPTION OF THE DRAWINGS

FIG. 1 is a schematic block diagram illustrating exemplary devices in which systems and methods of the present invention may be implemented;

FIG. 5 is a schematic block diagram illustrating an arrangement in a first communication device;

DETAILED DESCRIPTION

Figure 2:
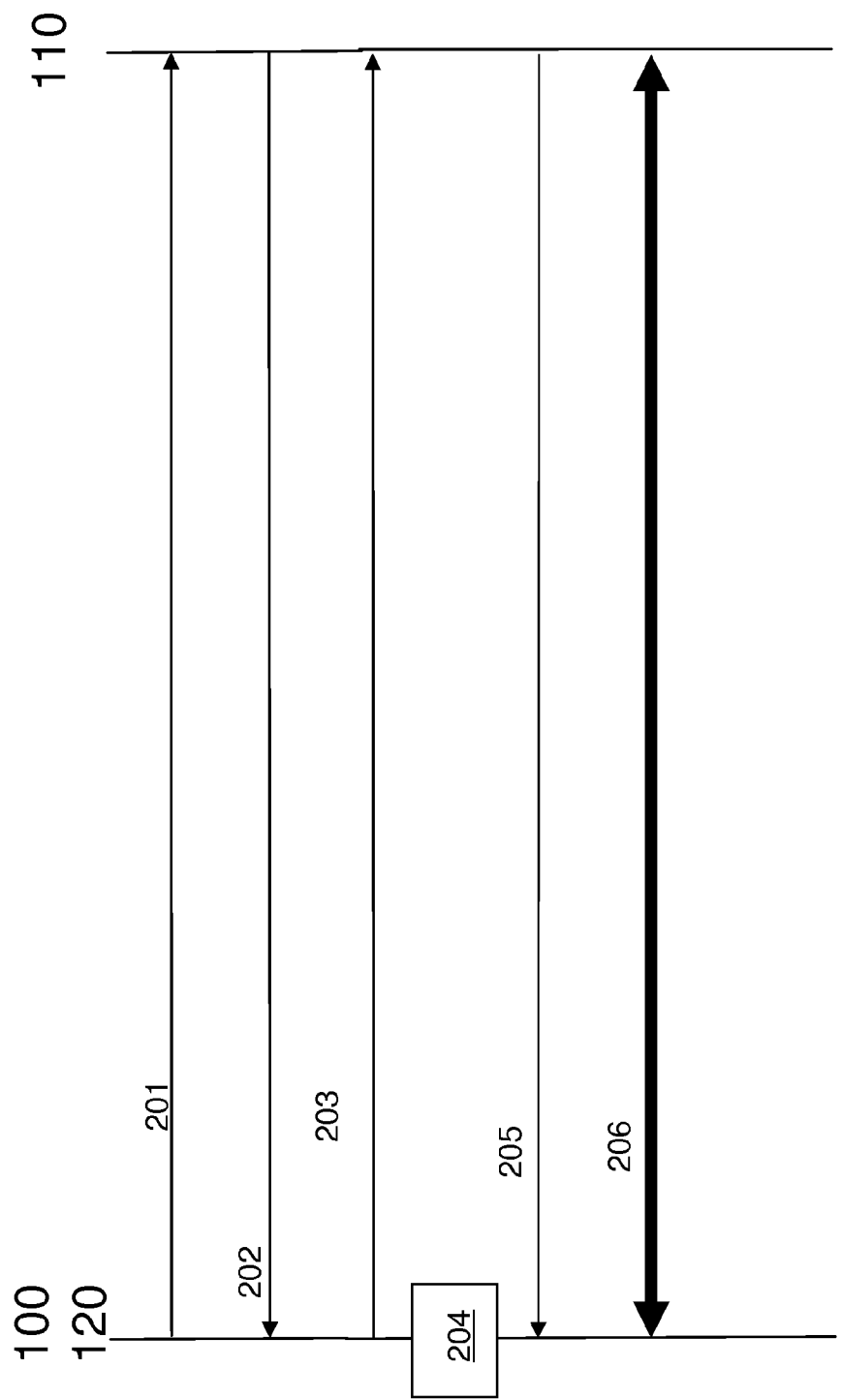
FIG. 2 is a combined signaling scheme and flowchart illustrating an embodiment of the present invention.

FIG. 1 shows a communication device, hereinafter, first device 100, that may be configured to communicate with a second communication device, hereinafter, second device 110. First device 100 and second device 110 may be networked in a communication system that may be any communication system, such as a radio communication system using technologies, such as Global System for Mobile (GSM) communication and Wideband Code Division Multiple Access (WCDMA), a plain old telephone service (POTS) system, a public switched telephone network (PSTN), the Internet, or the like. First device 100 and/or second device 110 may include, for example, a portable device, a cellular phone, a mobile terminal, a Personal Digital Computer, a POTS device, a computer, or any other communication device.

First device 100 may be configured to send a message to second device 110. The message may include any data sent via any messaging service, such as SMS, e-mail, MICROSOFT NETWORK (MSN), and GOOGLETALK. In some embodiments, first device 100 and/or second device 110 may include a respective telephone number or some other kind of address that enable communication via SMS or other protocol, using a SMS bearer or other type of bearer that may be circuit switched, packet switched, or the like. For purposes herein, SMS may include Multimedia Messaging Service (MMS). For example, first device 100 and/or second device 110 may include a Subscriber Identity Module (SIM) card or other function, such as Universal Mobile Telecommunications System SIM (USIM) or IP Multimedia Subsystem SIM (ISIM) including the telephone number or other type of address to the device, for example, that may uniquely identify the device (e.g., first device 100 and/or second device 110).

Assume a user of first device 100 desires to send some type of media message having a link to an application to a user of second device 110 via the messaging service. The application may include of any type of application, for example, that may be downloaded from, for instance, an application server 120. The application may be available on application server 120 for being downloaded into devices, such as second device 110. First device 100 may already include the application. In some embodiments, first device 100 may include application server 120. In other embodiments, application server 120 may be separated from first device 100. Application server 120 may be a software component that may reside on any device available in a network associated with first and second communication devices 100 and 110. The application may reside in a first phone, on a separate server on the Internet, and/or on a same server as where the application is downloaded from.

The application may be written in any open environment, such as in JAVA and/or UIQ, making it possible to install the application. The application may operatively enable real time communication between first device 100 and second device 110, e.g., voice, pictures, video, and/or any other type of communication.

Second device 110 may support download of applications, such as JAVA and/or UIQ devices. It should be appreciated that JAVA is an object oriented programming language developed at SUN MICROSYSTEMS. The JAVA language is used extensively on the World Wide Web (www). UIQ 3 is a software platform, pre-integrated and tested with the operating system Symbian OS v9, providing core technologies and services, such as telephony and networking As mentioned above, a user of first device 100 may desire to send a message with a link to an application to second device 110 via a messaging service. For example, a user of first device 100 may want the user of second device 110 to activate the link and download the application from application server 120 onto second device 110. In some embodiments, the user of first device 100 may wish to share the application with the user of second device 110 via an Internet Protocol (IP) connection, for example, to talk to the user of second device 110, using an IP telephony application, show a picture for the user of second device 110 using a picture viewer application, run an instant messaging (IM) session, etc. In this regard, second device 110 should be configured to run the same application. First device 100 may provide second device 110 with the application if second device 110 does not already comprise the application.

First device 100 may include a public IP address or any other address or identifier that may be addressed by a network. In current telecom systems and on the Internet, the number of IP addresses is limited. Therefore, insufficient addresses are available to provide public IP addresses to each and every user, and thus most users use private IP addresses. In the next version of IP, the IP v6 version, virtually limitless numbers of IP addresses will exist, allowing for everyone to have public IP addresses.

Where first device 100 does not include a public IP address, a user of first device 100 may not be directly contacted by second device 110. Instead, second device 110 may contact a messaging server 130, using an IP address of messaging server 130. Messaging server 130 may include any server that may forward messages from one user device to another user device, such as from/to first device 100 to/from second device 110, e.g., an e-mail, instant message, or any other type of communication. In some embodiments, messaging server 130 may complete the IP connection to first device 100, which is described in more detail below. In some implementations, first device 100 has a public IP address and no messaging server is used, as will be described below with reference to FIG. 2. In other implementations, first device 100 may not have any public IP address and a messaging server 130 is involved, as described in more detail below with reference to FIG. 3.

Messaging server 130 may include a general purpose server, not only connecting those devices without public IP numbers, but could also contain application specific functionality. The application in first device 100 may know the IP address of messaging server 130. The public IP address of first device 100 will hereinafter be termed the IP address of first device 100. The IP address of first device 100 may represent an identity, identifying first device 100, which identity is used by second device 110 for initiating an IP connection between first device 100 and second device 110.

In some embodiments, the IP address of messaging server 130 may be used by first device 100 to establish an IP connection to messaging server 130. First device 100 may send a request to messaging server 130, requesting a registration and an identity of the connection. That is, first device 100, which may wish to contact second device 110, may first register some identification of the desired connection in messaging server 130. The identity may be sent by first device 100, for example, in a message to second device 110. When second device 110 contacts messaging server 130, second device 110 may inform messaging server 130 of the identity. Messaging server 130 may then determine to which existing connection second device 110 should be connected. The identity may be, for example, a 128 bit hash code or any other unique identifier of the connection.

FIG. 2 is a combined signaling scheme and flowchart describing some embodiments of the present method. In these embodiments of the method, first device 100 may have a public IP address. The exemplary message service may be, for example, SMS. Other standards are possible. The exemplary method may include the following steps:

201. First device 100 may send a message to second device 110. Step 201 may be achieved, for example, by selecting the application in first device 100 and choosing second device 110 in a phone book in first device 100.

The message may include an identity for second device 110 to use for initiating an IP connection between first device 100 and second device 110. In this embodiment, when first device 100 has an IP address, the identity may correspond to the public IP address of first device 100.

The message may include a link to application server 120, from which the application may be downloaded onto second device 110. In this example, application server 120 may be associated in first device 100, such that the link to application server 120 may correspond to the IP address of first device 100. Alternatively, the link may also be a link to an application server that resides apart from first device 100.

The message may include an invitation (e.g., text) to be displayed in second device 110 if second device 110 does not already include the application. The invitation may include a readable text inviting the user of second device 110 to activate the link if so desired to download the application, such as, "the user of the first device wants to send you a picture. Please click on the link provided to enable receipt of the image file: http://xxx-.yyy.zzz."

202. Second device 110 may receive the message from first device 100. When the above-mentioned invitation is included in the message, the invitation may be displayed or otherwise rendered in second device 110. The link may be included in the message and activated in second device 110, upon the user of second device 110 selecting to activate the link. When activating the link, first device 100 including application server 120 may be contacted via the IP address of first device 100.

Second device 110 may begin downloading the application. The downloading process may take some time to complete. For example, for a signed Java application, the steps may include the user of second device 110 first clicking on the supplied link and thereby being provided a description of the application. The user may click on a second displayed link to download the application. When the application is downloaded, it may be installed, and once installed, the application may be initialized. One or more of the steps may be automatically performed and/or manually performed, depending, for example, on the application environment in first device 100. Downloading may be accomplish over a period of time that may be considered, by the user of first device 100, to be a relatively protracted time to wait in uncertainty as to a status of the invitation, e.g., whether the download of the application has started, failed, or other.

203. When second device 110 has activated the link received in the message, and started to download the application, application server 120 may inform first device 100 that the second device has started to download the application. The status information provided to first device 100 may be generated to address the above-mentioned state of uncertainly of the user of first device 100 as to downloading status. The status information may include an estimation of an amount of time that downloading will be accomplished. A more detailed description of how to detect and use information about second device 110 contacting application server 120 and downloading the application will be described in more detail below.

If second device 110 fails to download the application, first device 100 may be informed of the same. For example, the status information may be displayed or otherwise rendered via a display or other device in first device 100. The status information may advantageously indicate to the user of first device 100, since the user of first device 100 is in a state of uncertainty since it may not be known whether second device 110 is turned off, fails to contact application server 120, or simply has started to download the application which may take some time to accomplish.

One drawback to a state of uncertainty on the part of the user of first device 110, is that the user may terminate the invitation to share (e.g., transmit) the media message with second device 110 where the download of the associated application is deemed to be too long because on the assumption that second device 110 has failed to download the application, is not operating (e.g., turned off), or the user has declined to invitation. The displayed status information may inform the user of first device 100 whether or not to expect the connection between first device 100 and second device 110 to be established using the shared application. The status information may be displayed, for example using a change in the color of an icon in the display such as an icon representing the user of second device 110. Another example of displaying the information is to display signs moving in any direction, such as, some dots moving from left to right. Other indications of status information may be used to notify the user of first device 100.

204. Second device 110 may initiate an IP connection between first device 100 and second device 110, using the identity, which, in this embodiment, may be represented by the IP address of first device 100. This may be performed by the application having been successfully downloaded into second device 110.

205. An IP connection may be established between first device 100 and second device 110, and communication may occur therebetween using the shared application.

Figure 3:
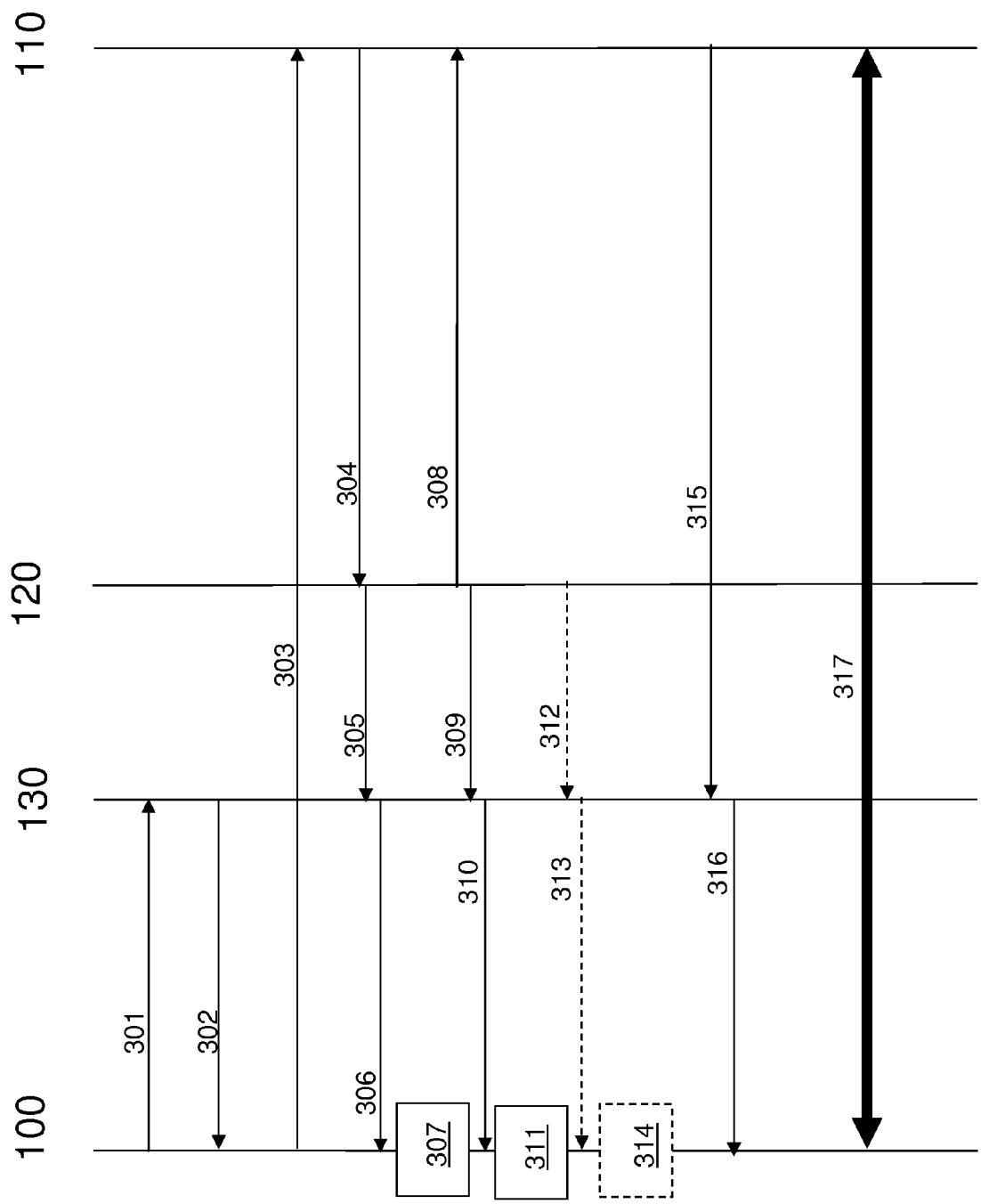
FIG. 3 is a combined signaling scheme and flowchart illustrating another embodiment of the present invention.

FIG. 3 is a combined signaling scheme and flowchart that shows some embodiments wherein first device 100 may not have a public IP address. Here, first device 100 may contact second device 110 via messaging server 130. The application in first device 100 may have access to the public IP address to messaging server 130. The message service in this example may include SMS or any other messaging format. The method may include the following steps:

301. First device 100 may connect to messaging server 130 using the appropriate IP address, to establish an IP connection between first device 100 and messaging server 130. The connection may be accomplished, for example, by running the application in first device 100 and selecting second device 110, for example, in a phone book or contact list in first device 100, which application may establish the connection to messaging server 130. The initiating of the connection may be performed by the application.

First device 100 may obtain an identity associated with the connection between first device 100 and messaging server 130, and the connection and its identity being registered in messaging server 130. Alternatively, first device 100 may create an identity identifying the connection between first device 100 and messaging server 130, and send the identity and a request to server 1 20 to register the connection and its identity in messaging server 130.

302. First device 100 may receive a response from messaging server 130, which may include the requested identity associated with the connection between first device 100 and messaging server 130, when the same has been requested. The response may include an invitation (e.g., text) formulated, for example, by messaging server 130, which may be sent by first device 100 to second device 110 in a subsequent step.

303. First device 100 may send a message to second device 110. The message may include an identity for second device 110 to use for initiating an IP connection between first and second devices 100 and 110. The identity in this embodiment may be represented by the identity associated with the existing connection between first device 100 and messaging server 130 obtained, for example, from messaging server 130 in step 302. The message may include the link to application server 120, from which the application may be downloaded into second device 110. The message may include the invitation to be displayed or otherwise rendered by second device 110.

304. Second device 110 may receive the message from first device 100. When the invitation is included in the message, the invitation may be displayed in second device 110. The link included in the message may be activated by the user of second device 110, if the user of the second device 120 opts to activate the link, and second device 110 may contact application server 120 with intent to download the application, by using the link included (e.g., embedded) in the message. When second device 110 contacts application server 120, second device 110 may enclose the identity identifying the connection between first device 100 and messaging server 130 received in the message.

305. Application server 120 may determine that first device 100 desires to share a particular application with second device 110 and use the connection between first device 100 and messaging server 130, and that second device 110 desires to download the application from application server 120. Application server 120 may send information to messaging server 130 that second device 110 has contacted application server 120 with intent to download the application. A more detailed description of techniques for detecting and using information about second device 110 contacting application server 120 and downloading the application will be described below.

306. When the information indicating that second device 110 has contacted application server 120 with intent to download the application is sent to messaging server 130, messaging server 130 may forward the information to first device 100, for example, using the connection set up in step 302.

307. When the information that second device 110 has contacted application server 120 with intent to download the application is sent to messaging server 130, is received by first device 100, first device 100 may displays the information, for example, via a display of first device 100. The information may displayed to inform the user of first device 100 that second device 110 has now contacted application server 120 in a manner similar to that described above with respect to step 204.

308. Second device 110 may begin to download the application into second device 110. Downloading the application may be achieved over a period of time as substantially described with respect to step 203.

309. Application server 120 may send information to messaging server 130 that second device 110 has begun downloading the application using the obtained status in a manner substantially as described with respect to step 305. A more detailed description as to how to detect and use information about second device 110 contacting application server 120 and downloading the application will be described below.

310. Messaging server 130 may receive the information that second device 110 has begun downloading the application and forward the information to first device 100, for example, using the connection setup substantially as described in step 302.

311. First device 100 may display the received information in the display or otherwise render some or all of the information via first device 100. The status information may operate to inform the user of first device 100 that second device 110 has begun to download the application. The information may be displayed to inform the user of first device 100 that second device 110 has begun downloading the application in a manner substantially as described with respect to step 203. The status information may include an estimation of an amount of time that downloading will be accomplished.

312. When, for any reason, downloading of the application to second device 110 fails or second device 110 is an incompatible device, application server 120 may inform messaging server 130 that the failure. This information may be sent as soon as it is determined, which may occur, for example, even before second device 110 starts the download, e.g., where second device 110 is an incompatible device. Step 305 corresponds to the sending of such information. A more detailed description of how to detect and use information about second device 110 contacting application server 120 and downloading the application will be described below. Step 312 is shown with a dashed line in FIG. 3.

313. When messaging server 130 receives the information that the download failed, the information may be forwarded by messaging server 130 to first device 100, for example, using the connection setup in step 302. Step 313 step is shown with a dashed line in FIG. 3.

314. When the information that second device 110 had failed to download the application is sent to messaging server 130, is received by first device 100, first device 100 may display the information in a display or otherwise render the information in first device 100. Step 314 is shown with a dashed square outline in FIG. 3. The information may inform the user of first device 100 that second device 110 has failed to download the application, in a manner substantially as described with respect to step 204.

315. The application downloaded in second device 110 may have access to the IP address of messaging server 130. Second device 110 may connect to first device 100 by establishing a connection to messaging server 130, using the appropriate IP address. Establishing the connection may be achieved by the application in second device 110 connecting to the application in first device 100.

Second device 110 may provides messaging server 130 with the identity identifying the existing connection between first device 100 and messaging server 130, which identity may be included in the message. Messaging server 130 may identify the existing connection using the identity.

316. When messaging server 130 has identified the connection associated with the identity, messaging server 130 may establish an IP connection between first device 100 and second device 110, for example, by connecting the connection between second device 110 and messaging server 130 with the connection between first device 100 and messaging server 130.

317. An IP connection may be established between first device 100 and second device 110. First device 100 may start communicating with second device 110, using the shared application.

A more detailed description of examples of how to detect and use information about second device 110 contacting application server 120 and downloading the application (e.g., status information) will now be described.

Applications may, in some embodiments, be divided into two separate files whereof the first file may include information about, for example, a supplier, and the second file may include the actual application. When second device 110 contacts application server 120 in that case, a request may be sent from second device 110 to application server 120 for a first portion of the installation file of the application. Application server 120 may obtain information about the type of device that second device 110 is, and which application platform is to be used. The information may indicate that second device 110 has activated the link and whether or not second device 110 may be used for the application. For example, information may be sent to first device 100 via messaging server 130 that second device 110 has activated the download of the application. If second device 110 is an incompatible device, status information of this type may be sent, for example to first device 100, for example, as performed in steps 305 and/or 306 in FIG. 3. Other status information may be sent to first device 100.

When accessing the second file of installation of the application, status information may indicate that the first installation file was successful, and second device 110 has continued with the installation. Accessing the second installation file may be indicative of second device 110 having started to download the application and information about the download may be sent in steps 309 and 310 in FIG. 3. When either of the steps does not occur, it may be indicative that second device 110 has an incompatible receiving platform. Status information of this type may be sent, for example, in steps 305 and/or 306 in FIG. 3.

In some embodiments, the file for installation of the application may be represented by a single file that includes information, for example, about a supplier, and/or the application. When second device 110 contacts application server 120 in that case, a request may be sent from second device 110 to application server 120 for the installation file of the application. Application server 120 may obtain the information about the type of device that second device 110 is and/or which application platform is to be used. The information may indicate that second device 110 has activated the link and whether or not second device 110 may be used for the application. For example, information may be sent to first device 100 via messaging server 130 that second device 100 has begun downloading the application where second device 110 is compatible. When second device 110 is not compatible, status information to that effect may be sent to first device 100. Status information of this type may be sent, for example, in steps 305 and/or 306 in FIG. 3.

Second device 110 may begin downloading the application. The downloading process may take some time to complete. For example, for a signed JAVA application, the steps may include the user of second device 110 first clicking on the supplied link and thereby being provided a description of the application. The user may click on a second displayed link to download the application. When the application is downloaded, it may be installed, and once installed, the application may be initialized. One or more of the steps may be automatically performed and/or manually performed, depending, for example, on the application environment in first device 100. Downloading may be accomplish over a period of time that may be considered, by the user of first device 100, to be a relatively protracted time to wait in uncertainty as to a status of the invitation, e.g., whether the download of the application has started, failed, or other.

When application server 120 observes that the activation of the link is repeated, this may indicate an abnormal condition exists. Status information of this type may be sent to first device 100, for example, in steps 305 and 306 and/or 309 and 310. Such information may be displayed or otherwise rendered in first device 100, for example, with a text, such as "The receiver has attempted to install the application and failed x number of times," for example, in steps 307 and/or 311. For example, such information may be stored in application server 120 to use to predict if a download and installation is possible for another device with the same platform as second device 110 when application server 120 has obtained information about the type of device the other device is.

Figure 4:
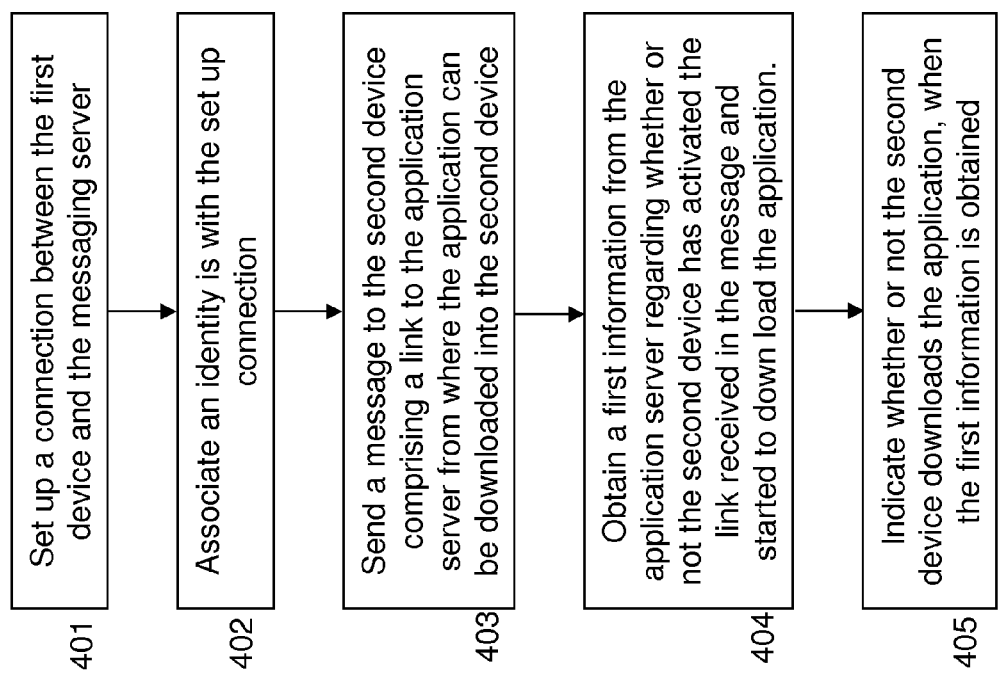
FIG. 4 is a flowchart illustrating the present method in a first communication device.

FIG. 4 is a flowchart describing an exemplary method consistent with the present invention as implemented in first device 100.

401. In some embodiments, a connection may be established between first device 100 and messaging server 130.

402. In the embodiments where a connection is established between first device 100 and messaging server 130, an identity may be associated with the established connection between first device 100 and messaging server 130.

403. A message may sent to second device 110 via the established connection. The message may include a link to application server 120 from where the application may be downloaded into second device 110. In the embodiments where an identity is associated with a setup connection between first device 100 and messaging server 130, the identity may be included in the message.

404. First information may be obtained from application server 120. The first information may indicate whether or not second device 110 has activated the link received in the message and started to download the application. The obtained first information may be received from application server 120 via messaging server 130. Messaging server 130 may be contacted by application server 120 to forward the first information from application server 120 to first device 100.

In some embodiments, second information about the type of device that second device 110 is, and/or which application platform that is available in second device 110 to be used for the application when downloaded into second device 110, may be received by application server 120 in an application download request from second device 110.

In these embodiments, third information may be obtained from application server 120. The third information may be included in the first information and may indicate that second device 110 may not be used for the application, when that was estimated in application server 120, based on the received second information.

In some embodiments fourth information may be obtained from application server 120, the fourth information may be included in the first information and may indicate that the download of the application into second device 110 has failed if no message of successful download was obtained from second device 110 to application server 120 within a predetermined amount of time.

In some embodiments, fifth information may be obtained from application server 120, the fifth information may be included in the first information and may indicate that second device 110 has attempted to install the application and failed x number of times, when application server 120 has received a plurality of requests for downloading from second device 110, which may be indicative of an unsuccessful download of the application.

405. First device 100 may indicate whether or not second device 110 attempts to download the application when the first information is obtained. Based on the indication, the user of first device 100 may be informed whether or not the user of second device 110 has started to download the application. The information may be indicated, for example, by a change in the appearance of an icon in a display in first device 100, such as displaying signs moving from left to right or from right to left in a display in first device 100. This is advantageous because the user of first device 100 has an interest in knowing whether or not the user of second device 110 installs the application in second device 110. In the embodiments where the third information is obtained, the step of indicating may be performed by indicating that second device 110 may not be used for the application. In the embodiments where the fourth information is obtained, the step of indicating may be performed by indicating that the download of the application into second device 110 has failed.

In the embodiments where the fifth information is obtained, the step of indicating may be performed by indicating that second device 110 has attempted to install the application and failed x number of times. This is advantageous because the user of first device 100 has an interest in knowing whether the download into second device 110 fails, instead of just waiting under the assumption that the download might take some time to accomplish.

To perform the method steps for sending a message with a link to an application to the user of second device 110, first device 100 may include a first device arrangement 500 depicted in FIG. 5. First device arrangement 500 may reside in a portable electronic device, such as a cellular phone and/or any type of mobile terminal.

First device arrangement 500 may include a transmitter 510 adapted to send a message to second device 110. The message may include a link to application server 120, from which the application may be downloaded into second device 110.

First device arrangement 500 may include an information obtaining unit 520 adapted to obtain first information from application server 120, whether or not second device 110 has activated the link received in the message, and started to download the application. The first information may indicate whether or not second device 110 has started to download the application.

In some embodiments, information obtaining unit 520 may be adapted to obtain the first information from application server 120 via messaging server 130 that is adapted to be contacted by application server 120 to forward the first information from application server 120 to first device 100.

In some embodiments, a second information about the type of device that second device 110 is, and/or which application platform is available in second device 110 to be used for the application when downloaded into second device 110, is adapted to be received by application server 120 in an application download request from second device 110. For example, information obtaining unit 520 may be adapted to obtain a third information, included in the first information from application server 120, the third information indicating that second device 110 may not be used for the application, when that was determined in application server 120 based on the received second information.

In some embodiments, information obtaining unit 520 may be adapted to obtain fourth information includeded in the first information from application server 1 20, the fourth information indicating that the download of the application into second device 110 failed, when no message of successful download was obtained from second device 110 within a predetermined amount of time.

In some embodiments, information obtaining unit 520 may be adapted to obtain fifth information that may be included in the first information from application server 120, the fifth information indicating that second device 110 has attempted to install the application and failed x number of times, when application server 120 has received a plurality of requests for download from second device 110, which may be indicative of an unsuccessful download of the application.

First device arrangement 500 may include an indication unit 530 adapted to indicate whether or not second device 110 downloads the application when the first information is obtained.

In some embodiments, indication unit 530 may be adapted to indicate that second device 100 may not be used for the application when the third information is obtained by information obtaining unit 520.

In some embodiments, indication unit 530 may be adapted to indicate that the download of the application into second device 110 has failed when the fourth information is obtained by information obtaining unit 520.

In some embodiments, indication unit 530 may be adapted to indicate that second device 110 has attempted to install the application and failed x number of times when the fifth information is obtained by information obtaining unit 520.

In some embodiments, indication unit 530 may be adapted to change the appearance of an icon in a display in first device 100 to indicate that second device 110 downloads the application. In some embodiments, indication unit 530 may be adapted to displaying signs moving from left to right or from right to left in a display in first device 100.

First device arrangement 500 may include a connection point 540 adapted to setup a connection between first device 100 and messaging server 130.

First device arrangement 500 may include an identity association unit 550 adapted to associate the established connection between first device 100 and messaging server 130 with an identity.

Transmitter 510 may be adapted to include the identity in the message to be sent to second device 110.

Figure 6:
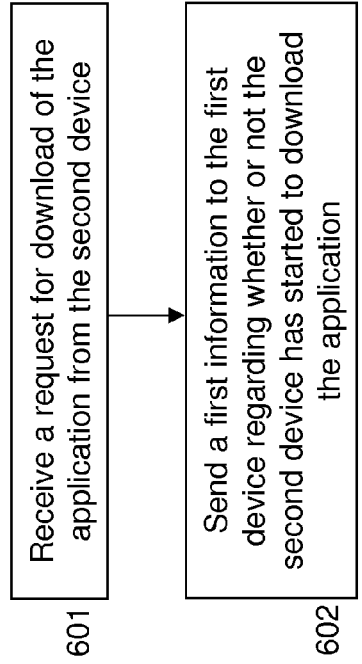
FIG. 6 is a flowchart illustrating the present method in an application server.

FIG. 6 is a flowchart describing an exemplary method consistent with the present invention as implemented in application server 120. Application server 120 may provide the application to be downloaded into second device 110. Application server 120 may reside in first device 100.

601. Application server 120 may receive a request for download of the application from second device 110, which may be occur when second device 110 has received a message from first device 100, which message includes the link to application server 120 for downloading the application, and when the link in the message is activated in second device 110.

In some embodiments, an identity may be received from second device 110 together with the message, which may occur when a connection between first device 100 and messaging server 130 is setup and associated with the identity, which identity was included in the message received by second device 110 from first device 100.

602. When the request for download is received at application server 120, first information may be sent to first device 100. The first information may indicate whether or not second device 110 has started to download the application.

In some embodiments, the request for download of the application may include second information about the type of device that second device 110 is and/or which application platform is available in second device 110 to be used for the application when downloaded. For example, it may be determined whether second device 110 may be used for the application or not, based on the second information. The second information may be included in the first information, i.e., a third information indicating that second device 110 may not be used for the application, where such was determined.

In some embodiments, fourth information may be included in the first information, which fourth information may indicate that the download of the application into second device 110 failed, where no message of successful download was obtained from second device 110 within a predetermined amount of time.

In some embodiments, fifth information may be included in the first information, the fifth information indicating that =second device 110 has attempted to install the application and failed x number of times, when a plurality of requests for download is received from second device 110, which indicates an unsuccessful download of the application. The fifth information may be stored together with the type of application platform of second device 110 to use to predict whether a download and installation is possible for another device with the same platform as second device 110.

In some embodiments, the first information may be sent to messaging server 130. For example, the identity may be used to identify messaging server 130. Messaging server 130 may be requested to forward the first information to first device 110.

Figure 7:
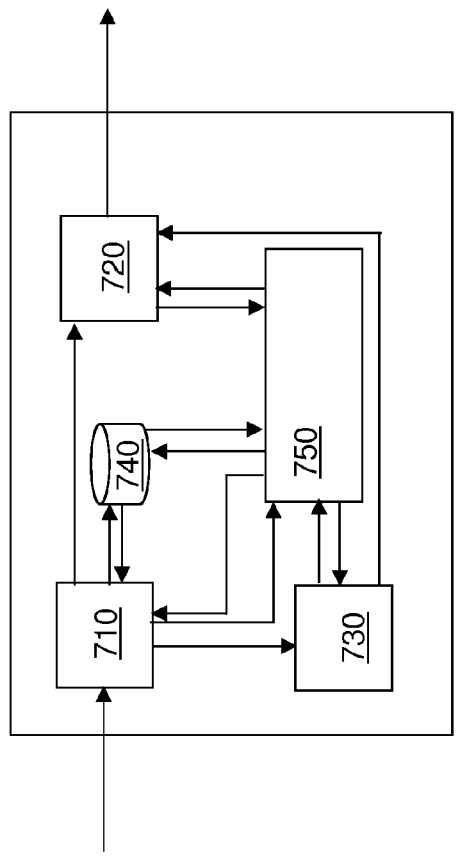
FIG. 7 is a schematic block diagram illustrating functional components in an application server.

To perform exemplary method steps in application server 120, application server 120 may include an application server arrangement 700 depicted in FIG. 7. Application server 120 may be adapted to provide an application to be downloaded into second device 110. Application server 120 may reside in first device 100.

Application server arrangement 700 may include a receiver 710 configured to receive a request for download of the application from second device 110, when second device 110 has received a message from first device 100, the message including a link to application server 120 for downloading the application, and when the link in the message is activated in second device 110.

In some embodiments, receiver 710 may be adapted to receive an identity from second device 110. The identity may be associated with an existing connection between first device 100 and messaging server 130, which identity was included in the message received by second device 110 from first device 120.

In some embodiments, the request for download of the application may include a second information about the type of device that second device 110 is and/or which application platform is available in second device 110 to be used for the application when downloaded.

Application server arrangement 700 may include a sending unit 720 adapted to send first information to first device 100 when the request for download is received, the first information indicating whether or not second device 110 has started to download the application.

Sending unit 720 may be adapted to send the first information to messaging server 130 and request that messaging server 130 forward the first information to first device 110.

Sending unit 720 may be adapted to use the identity to identify messaging server 130 for sending the first information to messaging server 1 30.

Sending unit 720 may further be adapted to send a fourth information comprised in the first information, to first device 100, said fourth information indicating that the download of the application into second device 110 failed if the receiver not has received any message of successful download was obtained from second device 110 within a predetermined time limit.

Sending unit 720 may be adapted to send fifth information included in the first information, to first device 100, the fifth information indicating that second device 110 has attempted to install the application and failed x number of times, when a plurality of requests for download is received from second device 110, which may be indicative of an unsuccessful download of the application.

For example, application server arrangement 700 may include an estimation unit 730 adapted to estimate whether second device 110 may be used for the application or not, based on the second information when received in the request for download of the application.

For example, sending unit 720 may be adapted to send third information included in the first information, to first device 100, the third information indicating second device 110 may not be used for the application, as determined by the estimating unit 730.

In some embodiments, application server arrangement 700 may include a database 740 adapted to store the fifth information together with the type of application platform of second device 110. Database 740 may be used to predict whether a download and installation is possible for another device with the same platform as second device 120.

Exemplary methods of the present invention may be implemented through one or more processors, such as a processor 560 in first device 100 depicted in FIG. 5, and such as a processor 750 in application server 120 depicted in FIG. 7, together with computer program code for performing the functions of the invention. The program code may also be provided as a computer program product, for instance in the form of a data carrier carrying computer program code for performing the present method when being loaded into first device 100 and/or application server 120. One such carrier may be in the form of a CD ROM disc. It is, however, feasible with other data carriers such as a memory stick. The computer program code may furthermore be provided as pure program code on a server and downloaded to first device 100 and/or application server 120 remotely.

When using the terms "comprise/comprising" and/or "include/including," the terms shall be interpreted as non-limiting, i.e., meaning, for example, "consist at least of."

The present invention is not limited to the above-describe exemplary embodiments. Various alternatives, modifications, and equivalents may be used. Therefore, the above embodiments should not be taken as limiting the scope of the invention, which is defined by the appending claims.

What is claimed is:

1. A method performed by a first communication device, the method comprising:

sending, by the first communication device via a network, a message to a second communication device, the message comprising a link to an application server from which a particular application is to be downloaded, via the network, by the second communication device;

obtaining, at the first communication device, first information, from the application server via the network, irrespective of whether the second communication device has activated the link and started to download the particular application, the first information indicating whether the second communication device has started to download the application, and the application server receiving, in a download request from the second communication device, second information about a type of the second communication device, and an application platform, used for the particular application when downloaded by the second communication device, that is available in the second communication device;

obtaining third information from the application server, the third information being included in the first information and indicating one of:

that the second communication device cannot be used for the particular application, based on a determination using the received second information, that the download of the particular application by the second communication device failed if no message of a successful download was obtained from the second communication device within a predetermined time limit, or that the second communication device has tried to install the particular application and failed a particular number of times; and providing, via a display of the first communication device, an indication indicating whether the second communication device downloads the particular application, based on the first information, and an indication indicating that the second communication device:

cannot be used for the particular application, failed to download the particular application, or has tried to install the particular application and failed the particular number of times.

2. The method according to claim 1, wherein indicating whether the second communication device downloads the particular application is performed by changing the appearance of an icon on the display of the first communication device.

3. The method according to claim 1, wherein indicating whether the second communication device downloads the particular application is performed by displaying signs moving from left to right or from right to left on the display of the first communication device.

4. The method according to claim 1, wherein the obtained first information is received from the application server via a messaging server, where the messaging server is contacted by the application server to forward the first information from the application server to the first communication device.

5. The method according to claim 4, further comprising:

setting up a connection between the first communication device and the messaging server;

associating the set up connection between the first communication device and the messaging server with identification information; and wherein the identification information is included in the message sent to the second communication device.

6. A non-transitory computer-readable medium storing instructions, the instructions comprising:

one or more instructions, which, when executed by a processor of a first communication device, cause the processor to:

send, via a network, a message to a second communication device, the message comprising a link to an application server from which a particular application is to be downloaded, via the network, by the second communication device;

obtain first information, from the application server via the network, irrespective of whether the second communication device has activated the link and started to download the particular application, the first information indicating whether the second communication device has started to download the application, and the application server receiving, in a download request from the second communication device, second information about a type of the second communication device, and an application platform, used for the particular application when downloaded by the second communication device, that is available in the second communication device obtain third information from the application server, the third information being included in the first information and indicating one of:

that the second communication device cannot be used for the particular application, based on a determination using the received second information, that the download of the particular application by the second communication device failed if no message of a successful download was obtained from the second communication device within a predetermined time limit, or that the second communication device has tried to install the particular application and failed a particular number of times; and provide, via a display of the first communication device, an indication indicating whether the second communication device downloads the particular application, based on the first information, and an indication indicating that the second communication device:

cannot be used for the particular application, failed to download the particular application, or has tried to install the particular application and failed the particular number of times.

7. A method performed by an application server, the method comprising:

receiving, by the application server, a request, for download of an application, from a second communication device via a network, responsive to the second communication device receiving a message from a first communication device via the network, the message comprising a link to the application server for downloading the application when the link in the message is activated in the second communication device;

receiving, by the application server and in a download request from the second communication device, second information about a type of the second communication device, and an application platform, used for the particular application when downloaded by the second communication device, that is available in the second communication device; and sending, by the application server and irrespective of whether the second communication device has activated the link and started to download the application, first information to the first communication device, via the network, when the request for download is received, said first information:
being provided, for display, by the first communication device,
indicating whether the second communication device has activated the link and started to download the application, and
including third information that indicates that the second communication device:
cannot be used for the particular application,
failed to download the particular application, or
has tried to install the particular application and failed the particular number of times.

8. The method according to claim 7, wherein sending the first information is performed by:
sending the first information to a messaging server; and
requesting the messaging server to forward the first information to the first communication device.

9. The method according to claim 8, wherein a connection between the first communication device and the messaging server is set up and associated with identification information, where the identification information is included in the message received by the second communication device from the first communication device, the method further comprising:
receiving the identification information from the second communication device; and
using the identification information to identify the messaging server for sending the first information to the messaging server.

10. The method according to claim 7, further comprising:
estimating if the second communication device can be used for the application, based on the second information, the third information being based on the estimating.

11. The method according to claim 10, further comprising:
storing the third information together with the type of application platform of the second communication device to use to predict if a download and installation is possible for another communication device with the same platform as the second communication device.

12. A non-transitory computer-readable medium storing instructions, the instructions comprising:
one or more instructions, which, when executed by a processor of an application server, cause the processor to:
receive a request, for download of an application, from a second communication device via a network, responsive to the second communication device receiving a message from a first communication device via the network, the message comprising a link to the application server for downloading the application when the link in the message is activated in the second communication device;
receive, in a download request from the second communication device, second information about a type of the second communication device, and an application platform, used for the particular application when downloaded by the second communication device, that is available in the second communication device; and
send, irrespective of whether the second communication device has activated the link and started to download the application, first information to the first communication device, via the network, when the request for download is received, said first information:
being provided, for display, by the first communication device,
indicating whether the second communication device has activated the link and started to download the application, and
including third information that indicates that the second communication device:
cannot be used for the particular application, failed to download the particular application, or has tried to install the particular application and failed the particular number of times.

13. A first communication device, comprising:
a transmitter unit to send, via a network, a message to a second communication device, the message comprising a link to an application server from which a particular application is to be downloaded into the second communication device via the network, where the application server comprises a processor and a memory;
a first information obtaining unit to obtain first information from the application server via the network,
the first information indicating whether the second communication device has activated the link,
the first information indicating whether the second communication device has started to download the particular application, and
the application server receiving, in a download request from the second communication device, second information about a type of the second communication device, and an application platform, used for the particular application when downloaded by the second communication device, that is available in the second communication device;
a second information obtaining unit to obtain third information from the application server, the third information being included in the first information and indicating one of:
that the second communication device cannot be used for the particular application, based on a determination using the received second information,
that the download of the particular application by the second communication device failed if no message of a successful download was obtained from the second communication device within a predetermined time limit, or
that the second communication device has tried to install the particular application and failed a particular number of times; and
an indication unit to provide, via a display of the first communication device, an indication indicating whether the second communication device downloads the particular application based on the first information, and an indication indicating that the second communication device:
cannot be used for the particular application,
failed to download the particular application, or
has tried to install the particular application and failed the particular number of times.

14. The first communication device according to claim 13, wherein the indication unit further is to change an appearance of an icon on the display of the first communication device to indicate that the second communication device downloads the particular application.

15. The first communication device according to claim 13, wherein the indication unit further is to display signs moving from left to right or from right to left on the display of the first communication device.

16. The first communication device according to claim 13, wherein the information obtaining unit further is to obtain the first information from the application server via a messaging server, where the messaging server is to be contacted by the application server to forward the first information from the application server to the first communication device.

17. The first communication device according to claim 16, further comprising:
a connection point to set up a connection between the first communication device and the messaging server;
an identity association unit to associate the connection between the first communication device and the messaging server with an identity; and
wherein the transmitter is to include the identity in the message sent to the second communication device.

18. The first communication device according to claim 13, where the first communication device is a portable communication device.

19. The first communication device according to claim 13, where the first communication device is a mobile phone.

20. An application server comprising:
a first receiver to receive a request, for download of an application, from a second communication device via a network, responsive to the second communication device receiving a message from a first communication device via the network, the message comprising a link to the application server for downloading the application, via the network, when the link in the message is activated in the second communication device;
a second receiver to receive, in a download request from the second communication device, second information about a type of the second communication device, and an application platform, used for the particular application when downloaded by the second communication device, that is available in the second communication device; and
a sending unit to send, irrespective of whether the second communication device has activated the link and started to download the application, first information to the first communication device, via the network, when the request for download is received, the first information:
being provided, for display, by the first communication device,
indicating whether the second communication device has started to download the application, and
including third information that indicates that the second communication device:
cannot be used for the particular application,
failed to download the particular application if the first receiver has not received any message of a successful download from the second communication device within a predetermined time limit, or
has tried to install the particular application and tailed the particular number of times.

21. The application server according to claim 20, wherein the sending unit further is to send the first information to a messaging server and request the messaging server to forward the first information to the first communication device.

22. The application server according to claim 21, wherein the receiver further is to receive an identity from the second communication device, which identity is associated with a set up connection between the first communication device and the messaging server, which identity was included in the message received by the second communication device from the first communication device, and wherein the sending unit further is to use the identity to identify the messaging server for sending the first information to the messaging server.

23. The application server according to claim 20, further comprising:
an estimation unit to estimate if the second communication device can be used for the application based on the second information, the
third information being based on the estimate.

24. The application server according to claim 20, further comprises a database to store the third information together with the type of application platform of the second communication device to use to predict if a download and installation is possible for another device with a same platform as the second communication device.

* * * * *

UNITED STATES PATENT AND TRADEMARK OFFICE
CERTIFICATE OF CORRECTION

PATENT NO. : 8,433,776 B2
APPLICATION NO. : 11/686220
DATED : April 30, 2013
INVENTOR(S) : Henrik Bengtsson et al.

Page 1 of 1

It is certified that error appears in the above-identified patent and that said Letters Patent is hereby corrected as shown below:

In the Claims:

Column 16, claim 6, line 27 should read: "that is available in the second communication device;"

Column 20, claim 20, line 12 should read: "has tried to install the particular application and failed"

Signed and Sealed this
Ninth Day of July, 2013

Teresa Stanek Rea
*Acting Director of the United States Patent and Trademark Office*